United States Patent
Fontaine et al.

(10) Patent No.: US 8,811,310 B2
(45) Date of Patent: Aug. 19, 2014

(54) CONTENTION FOR WIRELESS ACCESS USING TWO TYPES OF CHANNELS

(75) Inventors: Patrick Fontaine, Cesson Sevigne Cedex (FR); Francois Baron, Cesson Sevigne Cedex (FR); Philippe Chambelin, Cesson Sevigne Cedex (FR)

(73) Assignee: Thomson Licensing, Issy les Moulineaux (FR)

( * ) Notice: Subject to any disclaimer, the term of this patent is extended or adjusted under 35 U.S.C. 154(b) by 50 days.

(21) Appl. No.: 12/998,920

(22) PCT Filed: Dec. 15, 2009

(86) PCT No.: PCT/EP2009/067209
§ 371 (c)(1),
(2), (4) Date: Jun. 16, 2011

(87) PCT Pub. No.: WO2010/072624
PCT Pub. Date: Jul. 1, 2010

(65) Prior Publication Data
US 2011/0249659 A1 Oct. 13, 2011

(30) Foreign Application Priority Data
Dec. 22, 2008 (FR) ..................... 08 58948

(51) Int. Cl.
*H04W 4/00* (2009.01)
(52) U.S. Cl.
USPC ............................ 370/329; 370/328; 370/437
(58) Field of Classification Search
None
See application file for complete search history.

(56) References Cited

U.S. PATENT DOCUMENTS

| 6,041,238 | A  | * | 3/2000  | Tanoue ....................... 455/452.2 |
| 7,693,175 | B1 | * | 4/2010  | Benveniste .................. 370/447 |
| 7,835,339 | B1 | * | 11/2010 | Benveniste .................. 370/344 |
| 8,498,282 | B2 |   | 7/2013  | Doi et al. |
| 2002/0176437 | A1 | * | 11/2002 | Busch et al. ................. 370/437 |
| 2004/0081199 | A1 | * | 4/2004  | Lopez et al. ................. 370/468 |
| 2007/0002887 | A1 |   | 1/2007  | Benveniste |
| 2007/0009968 | A1 |   | 1/2007  | Cunningham et al. |
| 2007/0266157 | A1 |   | 11/2007 | Xhafa et al. |
| 2008/0117864 | A1 | * | 5/2008  | Wu et al. ..................... 370/329 |
| 2009/0196180 | A1 | * | 8/2009  | Bahl et al. ................... 370/235 |
| 2009/0232049 | A1 | * | 9/2009  | Singh et al. .................. 370/328 |
| 2009/0232068 | A1 | * | 9/2009  | Wu et al. ..................... 370/329 |
| 2010/0008316 | A1 | * | 1/2010  | Liu et al. ..................... 370/329 |

FOREIGN PATENT DOCUMENTS

| EP | 1594261    | 11/2005 |
| JP | 2008199593 | 8/2008  |

OTHER PUBLICATIONS

Search Rept:Apr. 13, 2010.

* cited by examiner

*Primary Examiner* — Donald Mills
(74) *Attorney, Agent, or Firm* — Robert D. Shedd; Jeffrey M. Navon; Catherine A. Cooper

(57) ABSTRACT

In order to increase the transmission speed in a wireless network comprising at least a node, the method comprises the following steps:
  transmission by the node over at least one first physical channel of at least one request to send,
  reception by the node of at least one agreement to send data over at least one second physical channel using at least one frequency band belonging to the extremely high frequencies, and the first and second physical channels being different,
  data transmission after reception.

14 Claims, 11 Drawing Sheets

CONTENTION FOR WIRELESS ACCESS USING TWO TYPES OF CHANNELS

Figure 1:
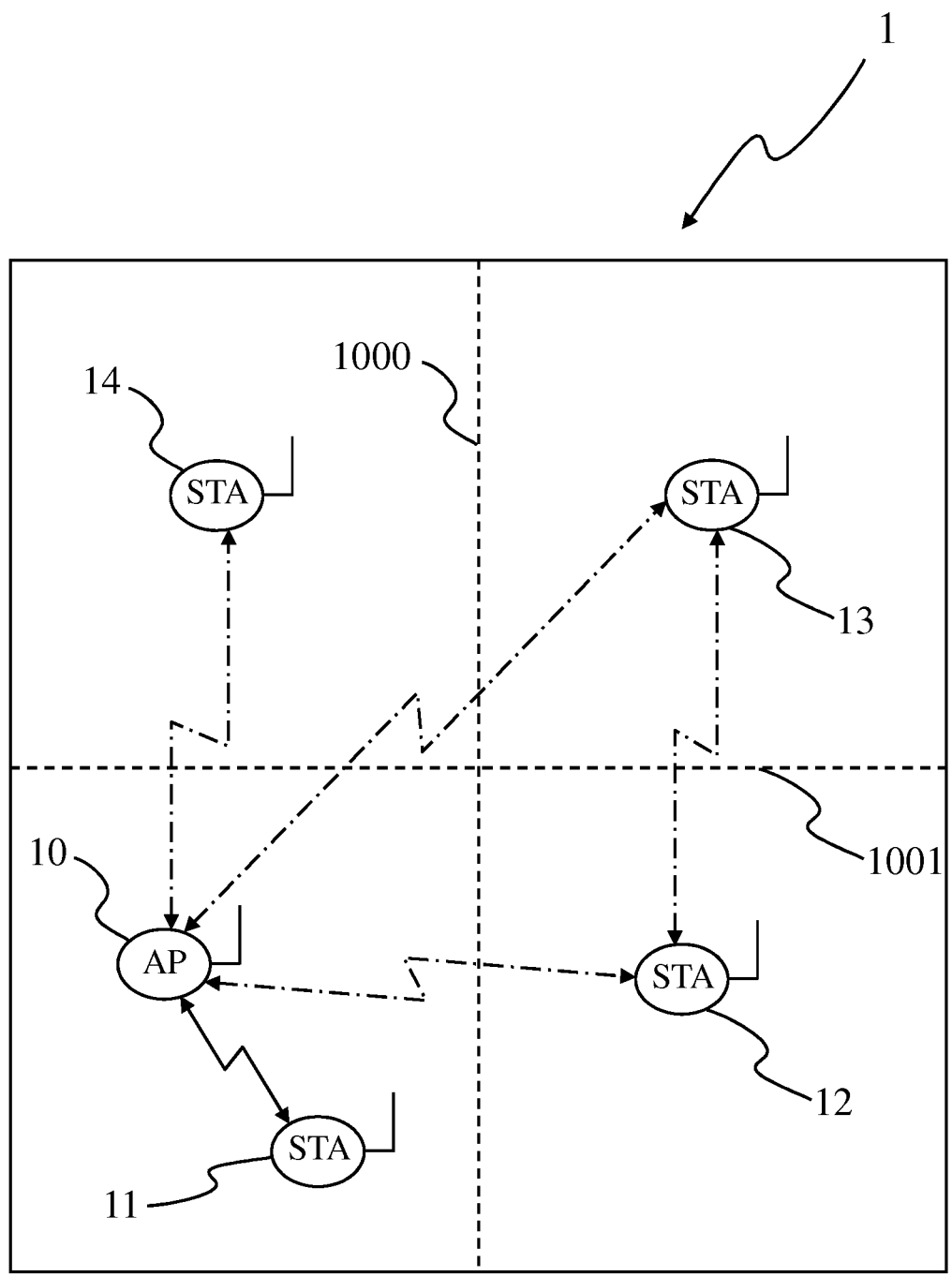

This application claims the benefit, under 35 U.S.C. §365 of International Application PCT/EP2009/067209, filed Dec. 15, 2009, which was published in accordance with PCT Article 21(2) on Jul. 1, 2010 in English and which claims the benefit of French patent application No. 0858948 filed Dec. 22, 2008

1. FIELD OF INVENTION

The invention relates to the telecommunications field and more precisely to the wireless data transmission with reservation of a physical channel in a network comprising at least one node.

2. PRIOR ART

According to the prior art, several wireless network architectures are known. Some of them use a medium access method with data packet collision avoidance. Hence, the Wi-Fi® system (based on IEEE standard 802.11) or a system based on the communication protocol, in non-beacon mode, defined by IEEE standard 802.15.4 implement a contention access mode of the CSMA/CA (Carrier Sense Multiple Access with Collision Avoidance) type according to the principle of control frame exchanges between network nodes, for example between an access point and a station. The exchanged control frames are of the RTS/CTS ('Request to Send'/'Clear to Send') type.

The bitrates reached by a Wi-Fi® system extend from 11 Mbits/s to 600 Mbits/s, for theoretical bitrates, and from 6.5 to 420 Mbits/s in practice according to IEEE protocol 802.11 (referring to IEEE standards 802.11a, 802.11b, 802.11g or 802.11n) (published by IEEE under the reference IEEE 802.11™-2007 entitled 'IEEE Standard for Information technology—telecommunications and information exchange between systems—Local and metropolitan area networks—Specific requirements/Part 11: Wireless LAN Medium Access Control (MAC) and Physical Layer (PHY) Specifications') implemented and the associated frequency band (typically, from 2 to 5 GHz). The bitrate attained by a system of the IEEE 802.15.4 type is typically in the order of 250 kbits/s. With the emergence of new services and new applications requiring increasingly higher transmission rates, the bitrates offered by such systems prove today inadequate to meet the expectations and needs of the users.

3. SUMMARY OF THE INVENTION

The purpose of the invention is to overcome these disadvantages of the prior art.

More especially, the purpose of the invention is to allow higher transmission bitrates in a wireless network while optimizing collision avoidance between different nodes of the network.

The invention relates to a transmission method in a wireless network comprising at least a first node. In order to increase the transmission speed, the method comprises the following steps:
transmission by the at least one first node over at least one first physical channel of at least one first request to send,
reception by the at least one first node of at least one first agreement to send data over at least one second physical channel using at least one frequency band belonging to the extremely high frequencies (EHF).
the first and second physical channels being different, and transmission of data after the reception.

Hence, the transmission method according to the invention is used for transmitting high bitrate data over the second physical channel using at least the frequency band belonging to extremely high frequencies by using the first physical channel for the first request to send. One or more first node(s) sends or send over one or more first physical channel(s) one or more first request(s) to send, receive one or more agreement (s) to transmit over one or more second physical channel(s).

Advantageously, the at least a first node accesses the wireless network by using a contention access method and the at least a physical channel is less sensitive to external perturbation than the at least a second physical channel.

According to a particular characteristic, that the at least one first physical channel and the at least one second physical channel use different frequency bands.

Advantageously, the at least one first physical channel uses a frequency band, all the frequencies of which are less than 30 GHz.

According to another characteristic, the at least one first agreement to send is received by the at least one first node over the at least one first physical channel.

According to a specific characteristic, the method comprises a transmission step by the at least one first node over the at least one second physical channel of at least one second request to send over the at least one second physical channel.

Advantageously, the method comprises a receiving step by the at least one first node over the at least one second physical channel of at least one second agreement to send data over the at least one second physical channel.

According to another characteristic, the method comprises a receiving step by the at least one first node over the at least one first physical channel of at least one second agreement to send data over the at least one first physical channel and in that the at least one first agreement to send is received over the at least one second physical channel.

According to a particular characteristic, the method comprises the following steps:
reception quality test of at least one first agreement to send and reception quality test of at least one second agreement to send, and
transmission of data over the at least one first physical channel and/or over the at least one second physical channel according to the result of the quality test.

According to a specific characteristic, at least one data packet transmitted over the at least one first physical channel has a higher priority level than an at least one data packet transmitted over the at least one second physical channel.

Advantageously, at least one part of the data transmitted over the at least one second physical channel is transmitted again by the at least one first node over the at least one first physical channel, if
information representative of non-reception of the data transmitted over the at least one second physical channel is received by the at least one first node, or
no information representative of the reception of the data transmitted over the at least one second physical channel is received before expiry of a determined time.

According to another characteristic, information representative of the reception of data transmitted over the at least one second physical channel is received by the at least one first node over the at least one first physical channel.

Advantageously, the at least one first request to send comprises at least one field comprising information representative of a request to send data on the at least one first and/or the at least one second physical channel.

According to a particular characteristic, the at least one first agreement to send comprises at least one field comprising information representative of an authorization or refusal to send data over the at least one first and/or the at least one second physical channel.

The invention also relates to a communication management method in a wireless network comprising at least a first node, the method comprising the following steps:
reception by the at least one first node over at least one first physical channel of at least one first request to send,
transmission by the at least one first node of at least one first agreement to send data over at least one second physical channel using at least one frequency band belonging to the extremely high frequencies (EHF).
the first and second physical channels being different.

Hence, the management method according to the invention is used for optimizing the reservation of the second physical channel using at least the frequency band belonging to the extremely high frequencies for the transmission of high bitrate data by the reception of a request to send emitted over the first physical channel.

4. LIST OF FIGURES

Figure 2:
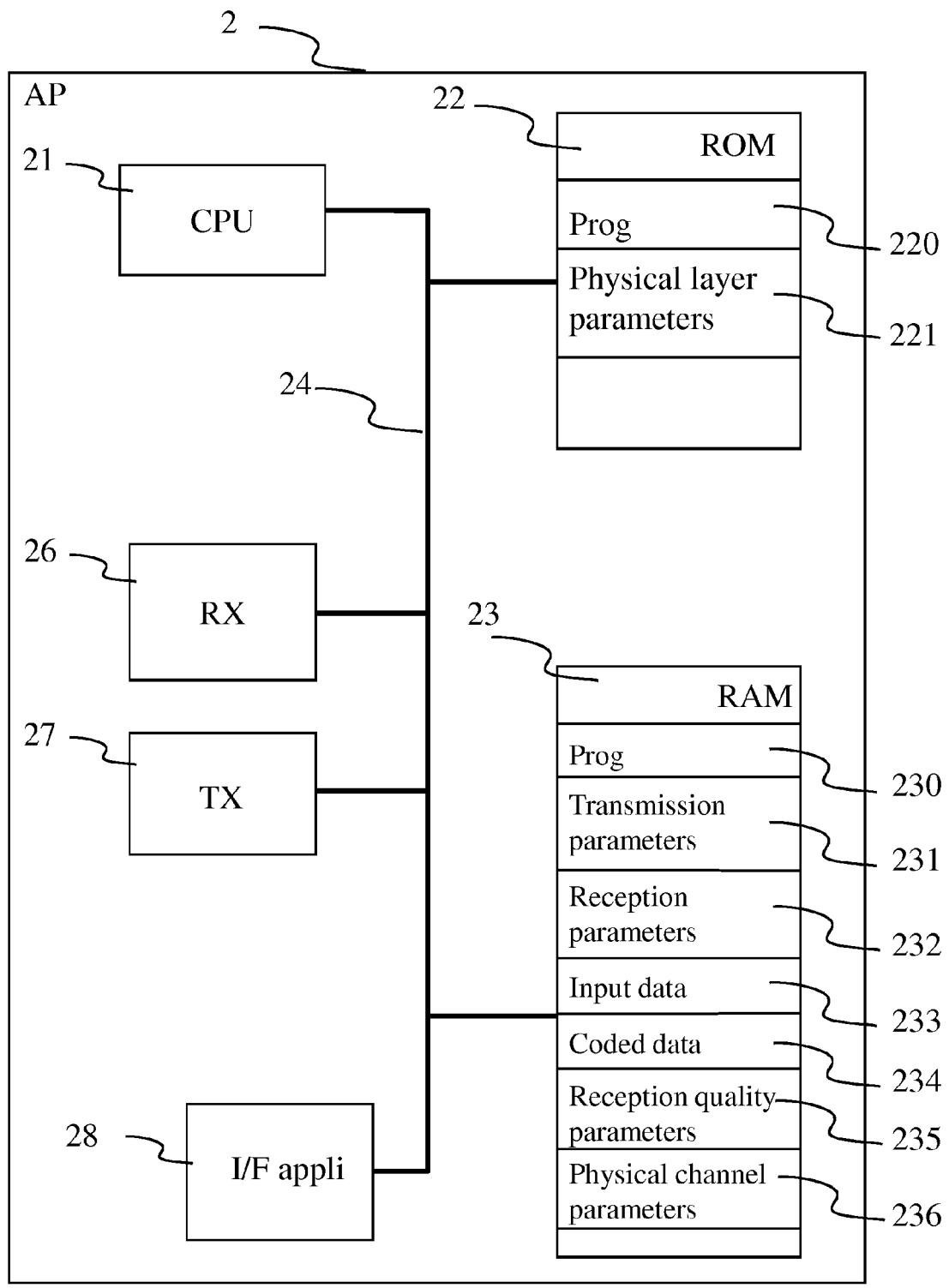
Figure 3:
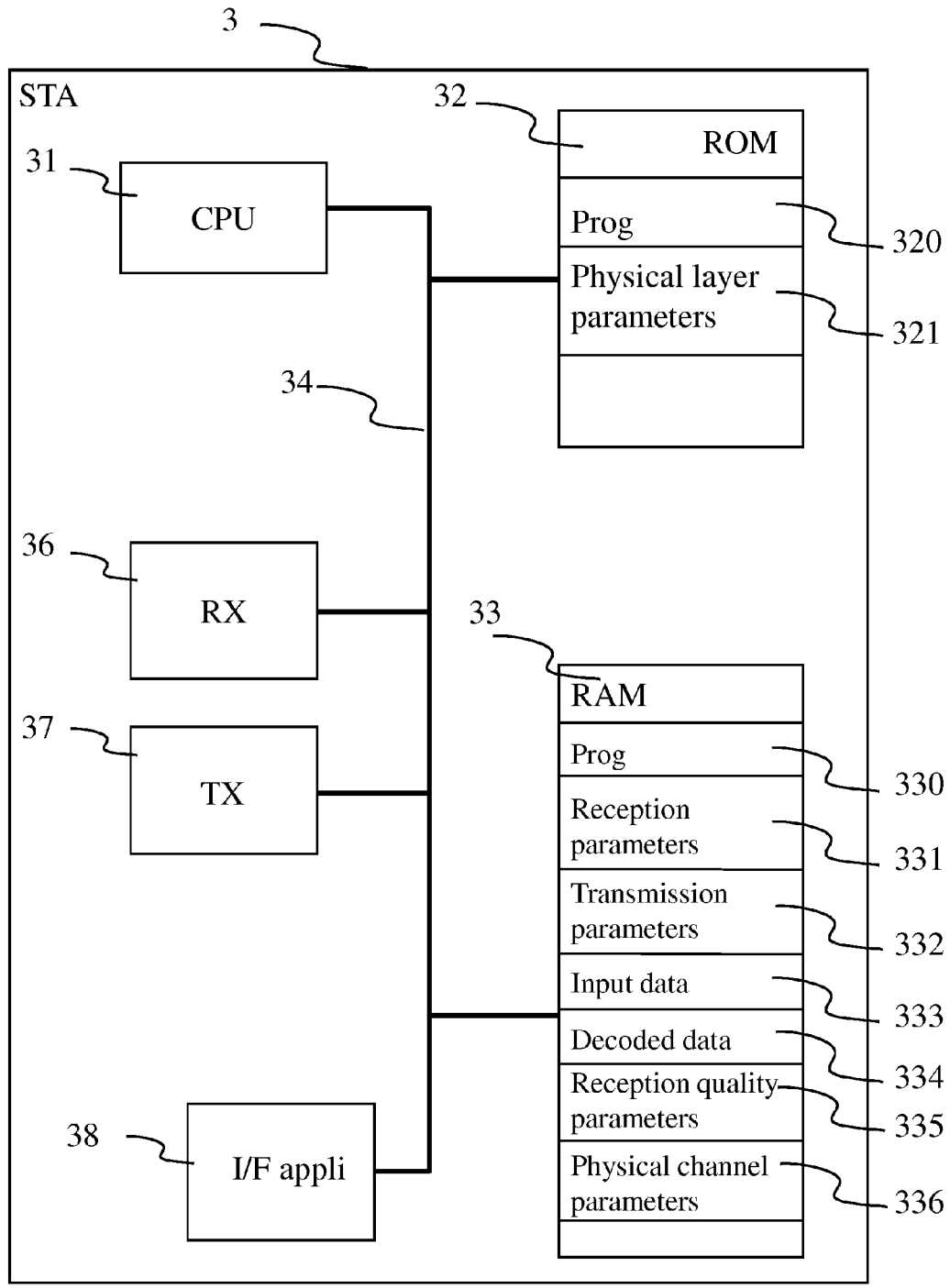
Figure 4:
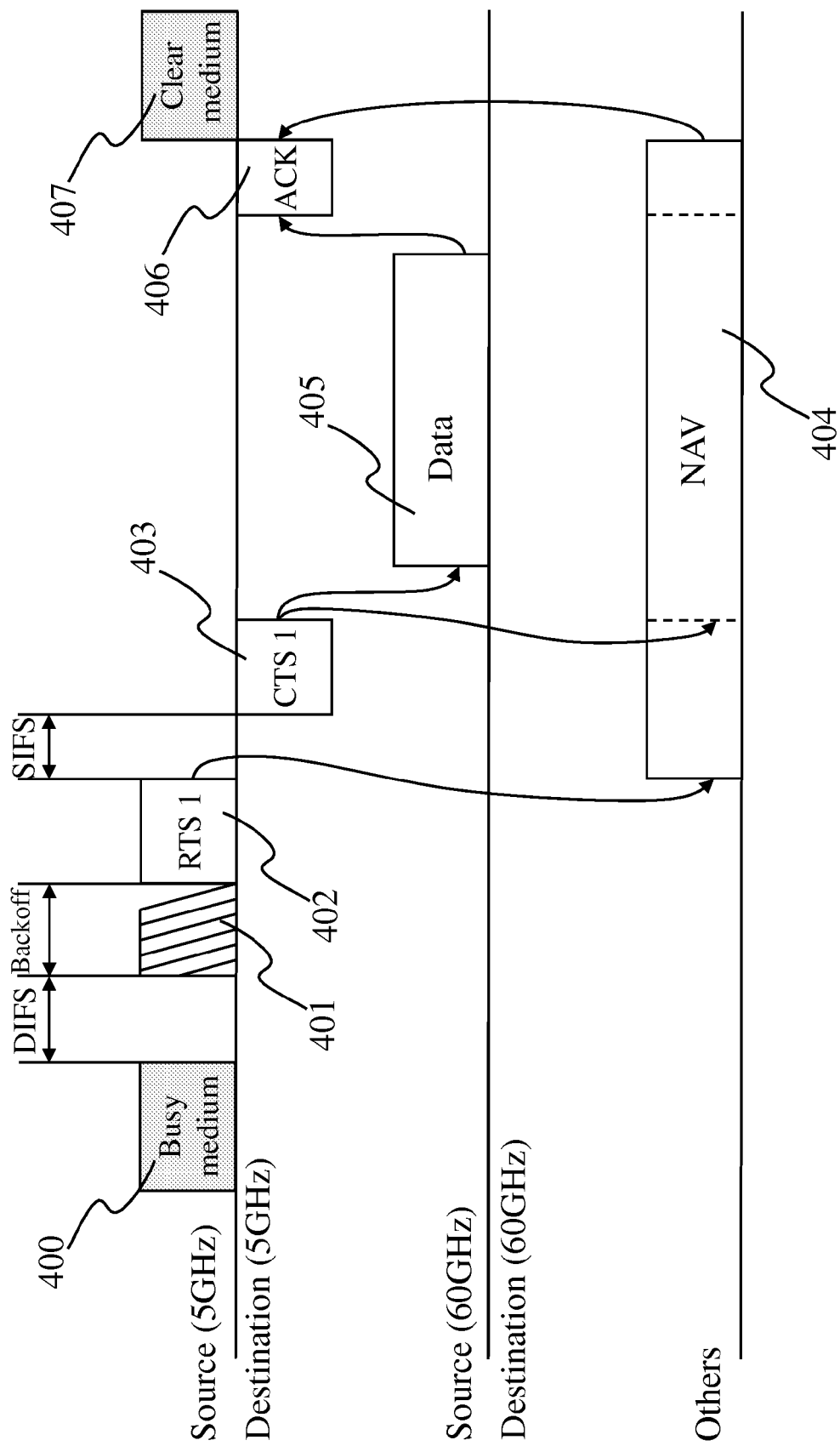
Figure 5:
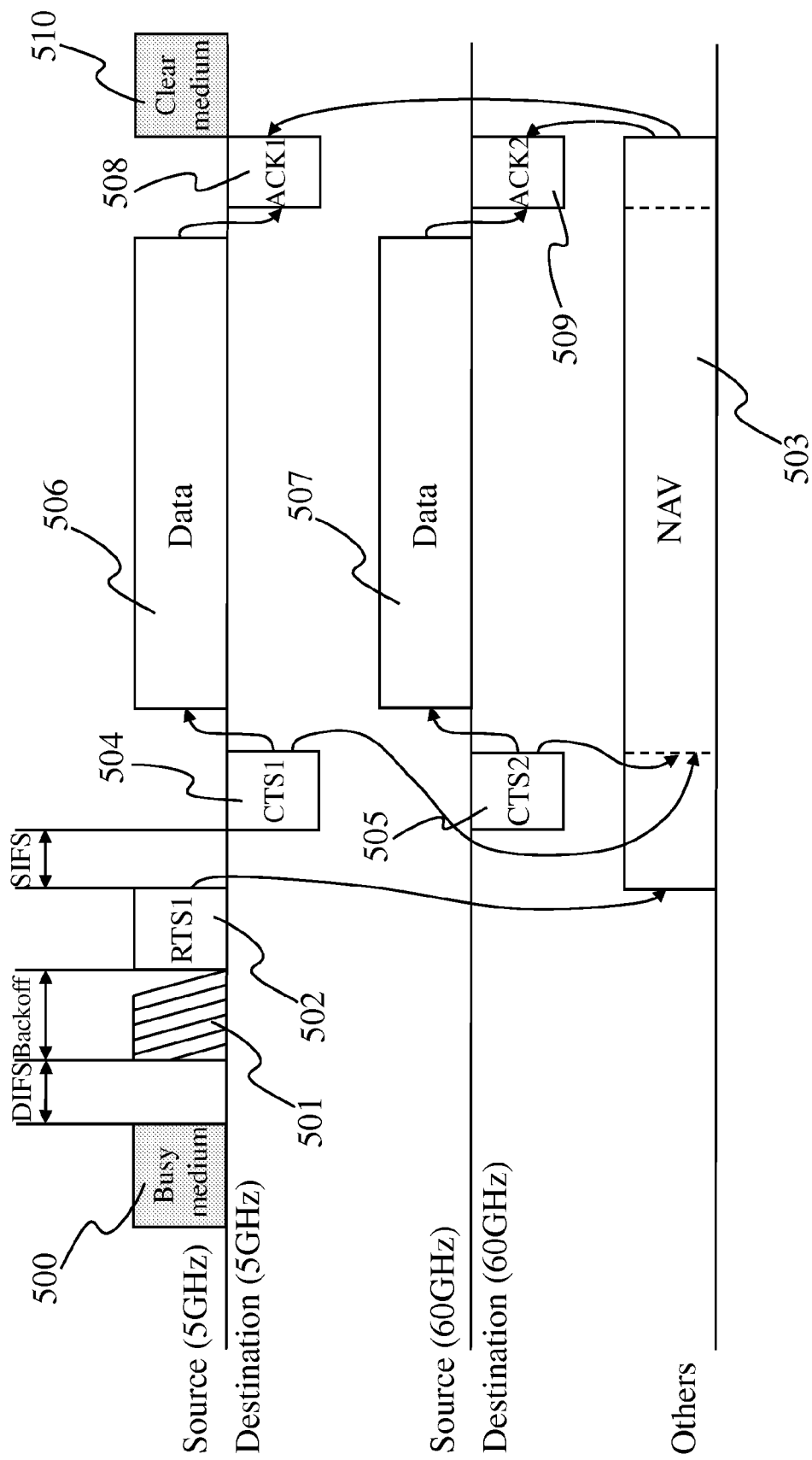
Figure 6:
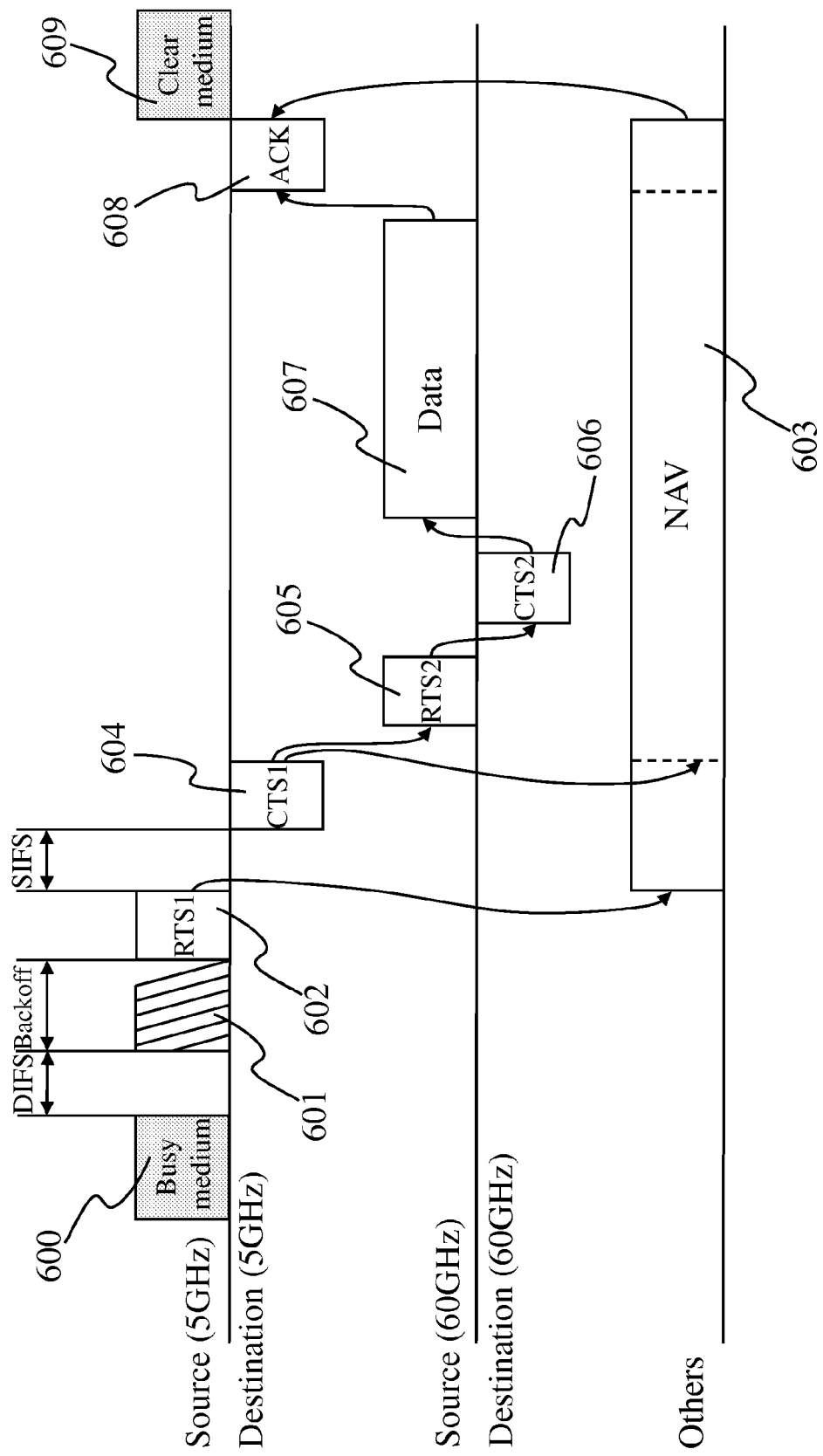
Figure 7:
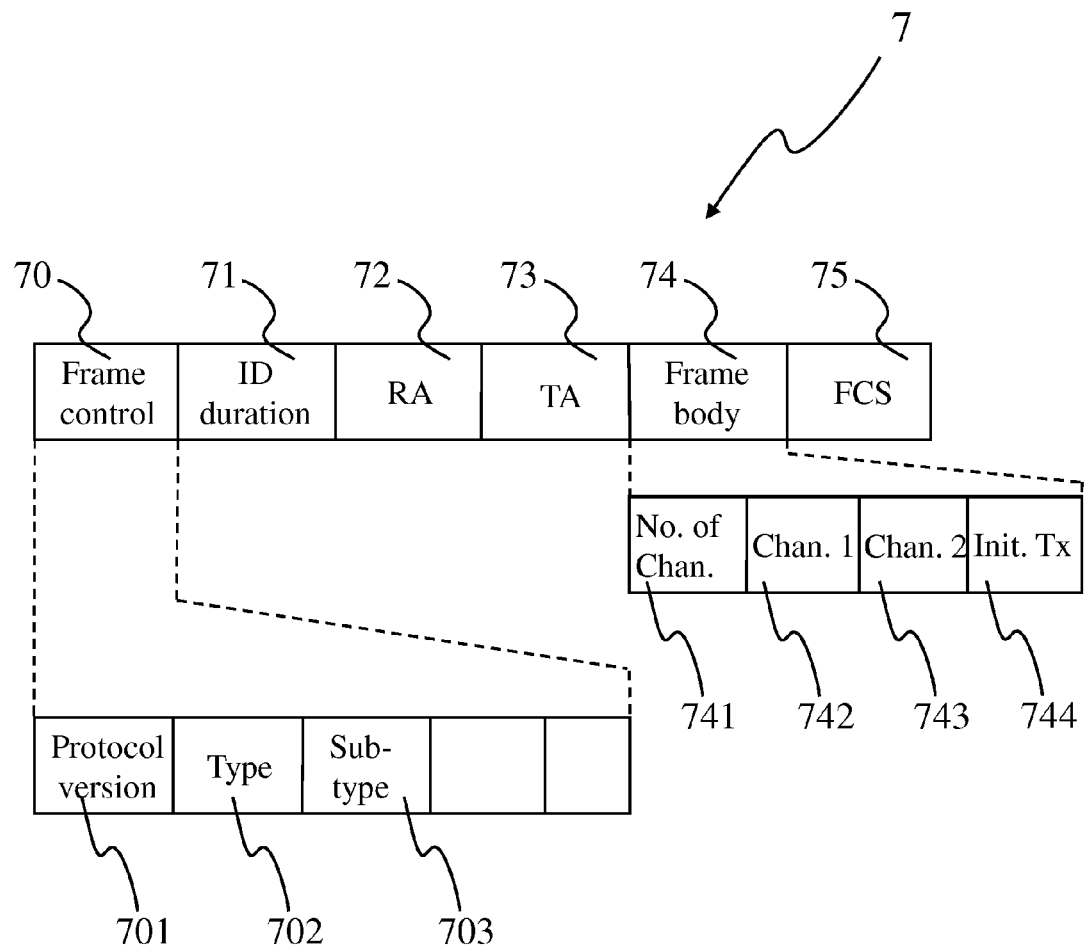
Figure 8:
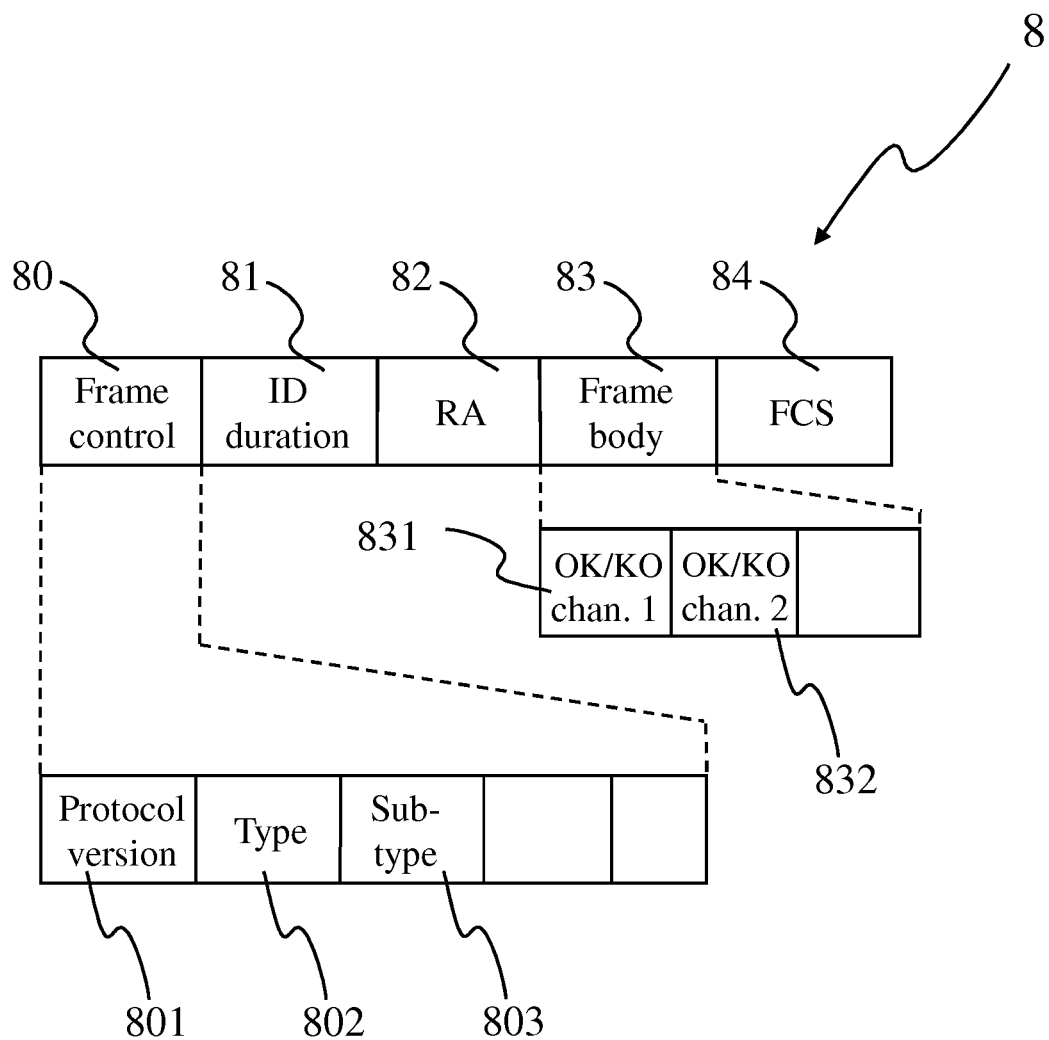
Figure 9:
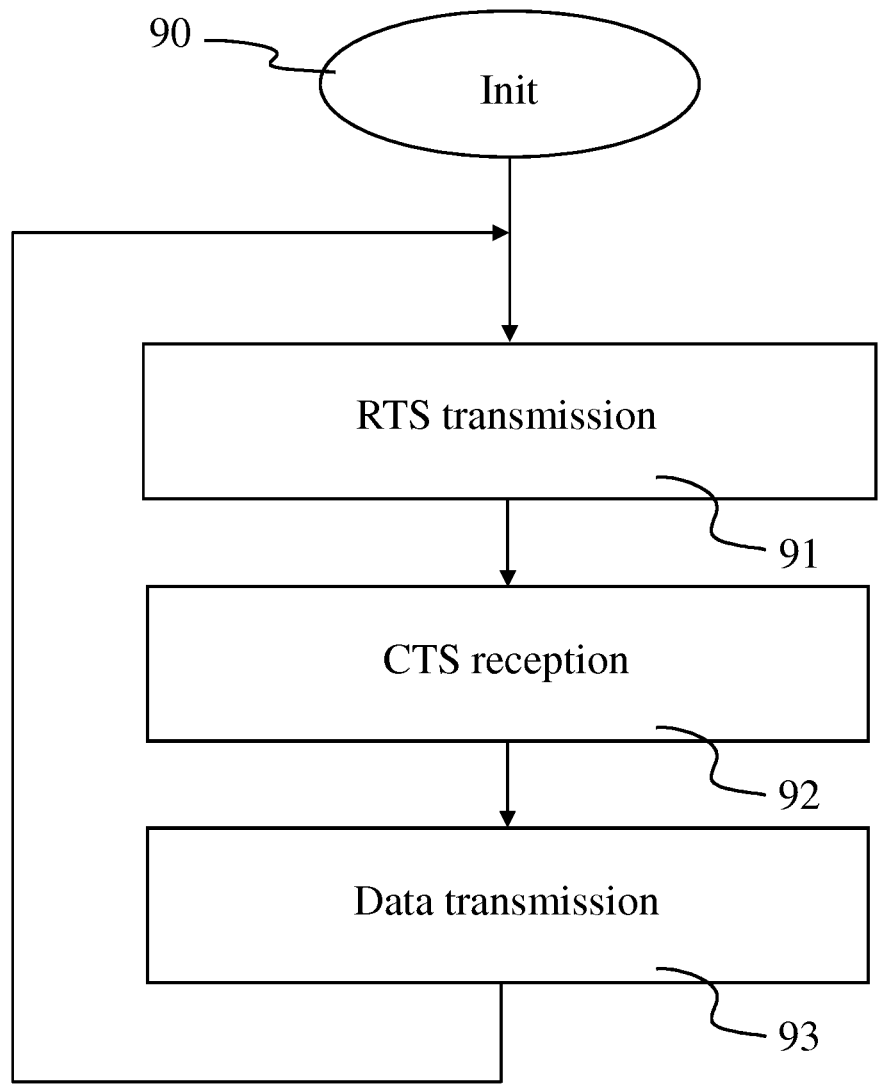
Figure 10:
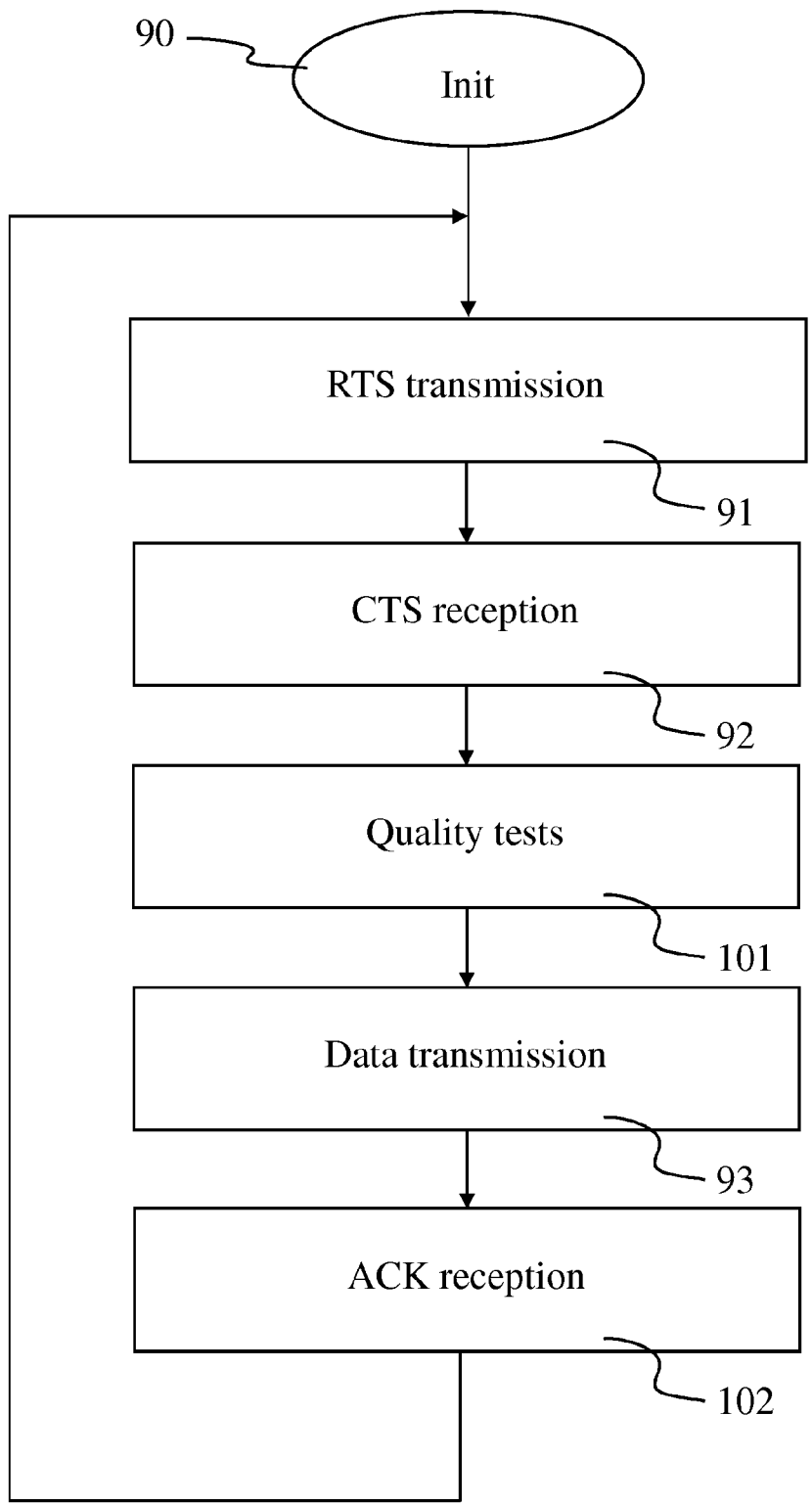
Figure 11:
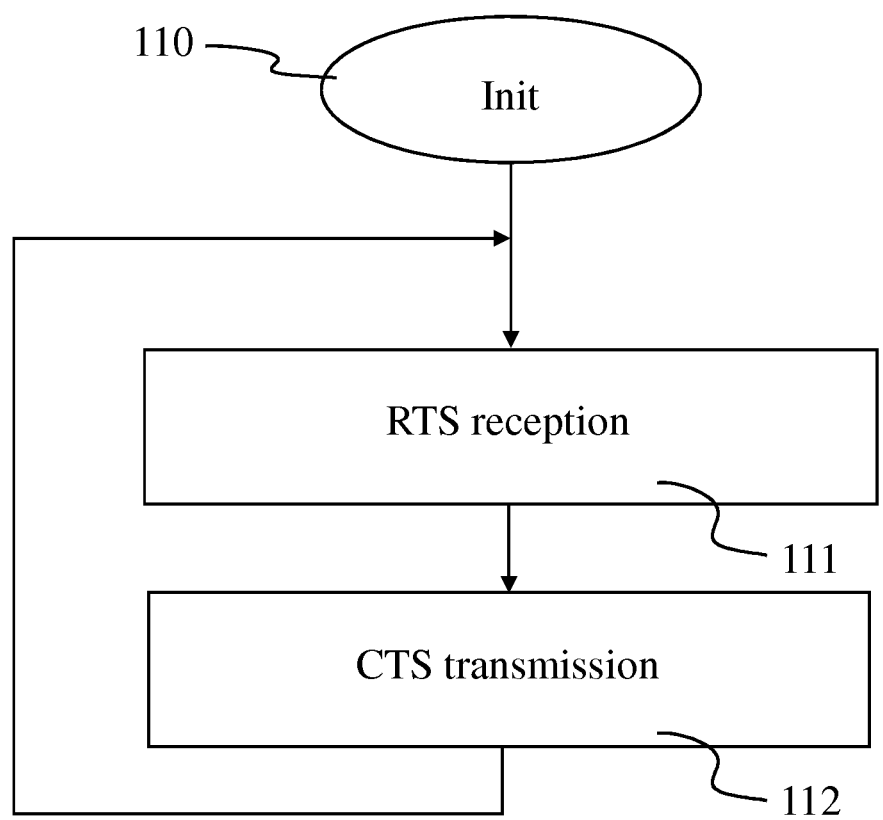

The invention will be better understood, and other specific features and advantages will emerge upon reading the following description, the description making reference to the annexed drawings wherein:

FIG. 1 illustrates a wireless system implementing several nodes, according to a particular embodiment of the invention, FIGS. 2 and 3 schematically illustrate respectively an access point and a station of the system of FIG. 1, according to the invention, FIGS. 4, 5 and 6 illustrate respectively frame transmission/reception modes according to particular modes of the invention, implemented by nodes of the system of FIG. 1, FIGS. 7 and 8 schematically illustrate respectively the content of an RTS frame and the content of a CTS frame transmitted and received by a node of the system of FIG. 1, according to two particular embodiments of the invention, FIGS. 9 and 10 illustrate a transmission method implemented by a node of the system of FIG. 1, according to particular embodiments of the invention, and FIG. 11 illustrates a communication management method implemented by a node of the system of FIG. 1, according to a particular mode of the invention.

5. DETAILED DESCRIPTION OF THE INVENTION

Generally but not restrictively, the invention relates to a transmission method in a wireless network with channel reservation to transmit data and a corresponding communication management method. The transmission of one or more requests to send RTS and the reception of one or more agreements (or 'clears') to transmit CTS are advantageously carried out over at least one first physical channel whereas data transmission is advantageously carried out over at least one second physical channel using one or more frequency bands belonging to the extremely high frequencies. According to an advantageous characteristic, the first physical channel is characterized by higher robustness, i.e. less sensitive to external disturbances (for example, obstacles, reflections by obstacles, interference, Doppler effect) for data transmission than the second physical channel. For this purpose, the first physical channel uses for example one or more 2.4 GHz and/or 5 GHz frequency bands, whereas the second physical channel uses a frequency band belonging to the extremely high frequencies (EHF), for example a band close to 60 GHz. The exchange of RTS/CTS frames over the first channel offers the advantage that these frames are received by a large number of nodes (access points and/or stations) of the network, even if the nodes receiving these frames are separated from the emitting node by a physical obstacle and/or are far from the sender. Advantageously, the receiving nodes then abstain from transmitting for a determined period indicated or not in the RTS and/or CTS frames. The transmission of data over the second channel offers the advantage of a high bitrate since the available frequency bands are generally wide in the EHF.

FIG. 1 illustrates a wireless communication system 1 implementing several network nodes compatible with IEEE standard 802.11™-2007, including an access point 10 and several stations 11, 12, 13 and 14, according to a particular embodiment of the invention. As a simple example, the access point 10 and the station 11 are in direct line of sight whereas the stations 12, 13 and 14 are neither in direct line of sight with the access point 10 nor the station 11. The access point 10 is separated from the station 14 by a partition 1000, the access point 10 is separated from the station 13 by two partitions 1000, 1001, the access point 10 is separated from the station 12 by the partition 1000 and the station 12 is separated from the station 13 by the partition 1001. Each of the nodes 10 to 14 is able to receive and decode the signals sent by each of the other nodes 10 to 14. The partitions 1000 and 1001 are an obstacle to the frequencies belonging to the EHF and let low frequencies pass, i.e. frequencies lower than 30 GHz and advantageously frequencies less than 20 GHz. Indeed, EHF do not have the same propagation properties (range, attenuations according to the obstacles, reflections by obstacles, interference, etc.) as lower frequencies such as, typically, frequencies lower than 30 GHz. The EHF have a range lower than that of low frequencies, for example a ten times lower range, the EHF do not go through obstacles such as walls or the body of a human being or go through them with a high attenuation, EHF are highly sensitive to reflections on obstacles (for example, moving body) and interference. The access point 10 and the station 11 which are in direct line of sight and close to each other exchange data over a physical channel using a frequency band, all the frequencies of which belong to the EHF. The access point 10 transmits data to each of the stations 12, 13 and 14 over a physical channel using at least one frequency band, all the frequencies of which are lower than 30 GHz, for example equal to 2.4 GHz and/or 5 GHz, since each of the stations 12, 13 and 14 is separated from the access point 10 by a partition 1000, 1001. In the same manner, the stations 12 and 13 are separated by a partition 1001 and use a physical channel using a frequency band, all the frequencies of which are less than 30 GHz, for example 2.4 and 5 GHz to exchange data. The links between nodes are symbolized by solid line broken arrows when a transmission is possible between two nodes (access point or stations) in the first and second channels corresponding respectively to frequency bands less than and greater than 30 GHz. One or more request(s) to send is/are sent over one or more first channel(s) as data is advantageously transmitted over one or more second channel(s). The links between nodes are symbolized by dotted line broken arrows when a transmission is possible between two nodes (access point or stations) in the first channel corresponding to frequencies lower than 30 GHz and impossible or highly disturbed in the second channel corresponding to frequencies greater than 30 GHz.

Advantageously, the stations 11 to 14 of the system 1 are portable units, for example portable terminals, telecommunication devices or telephone suited to receive and/or process data and services sent by the access point 10, fixed or mobile, of the system 1 (for example, voice or audio data restitution and/or display of video data, or more generally restitution, storage or processing of multimedia data).

Advantageously, the access point 10 of the system 1 is a fixed device, for example a relay station or a router. The access point is a high power transmitter suitable for the broadcasting of data over a wide coverage area or an average or low power transmitter suitable for the broadcasting of data over a more restricted coverage area. According to a variant, the access point forms a system covering a 'picocell', i.e. a small area, like the inside of a building, of a supermarket, of a station, i.e. having a range of some ten or so meters (according to some embodiments, in a picocell, the range is advantageously less than 300 m). According to another variant, the access point forms a system designed to cover a 'femtocell', i.e. a restricted area smaller than a picocell, like some rooms of a house or of a building, a floor of a building, an aircraft, i.e. having a range of a few meters (according to some embodiments, in a femtocell, the range is advantageously less than 100 m).

Advantageously, the access point 10 is connected to a second network not represented on FIG. 1. This second network is of the wired (for example Ethernet) or of the wireless type.

According to a variant, the access point 10 and the stations 11 to 14 are of the SISO ('Single Input Single Output') type and only have a single antenna.

According to another variant, the access point 10 and the stations 11 to 14 are of the MIMO ('Multiple Input Multiple Output') type and each have a MIMO coder and/decoder and several antennas transmitting and/or receiving a MIMO signal.

Advantageously, one part of the nodes 10 to 14 of the system 1 is of the SISO type and the other part of the MIMO type.

FIG. 2 diagrammatically illustrates a hardware embodiment of an access point 2 corresponding for example to the access point 10 of FIG. 1.

The access point 2 comprises the following elements, connected to each other by an address and data bus 24 which also transports a clock signal:
- a microprocessor 21 (or CPU),
- a non-volatile memory of the ROM (Read Only Memory) type 22,
- a Random Access Memory (RAM) 23,
- at least one radio interface 26, for example two, three or four radio interfaces each suitable for the reception of radio frames (for example, RTS/CTS signalling or data frames) in a determined frequency band (for example, in an EHF band or in a band where all frequencies are less than 30 GHz); according to a variant, a radio interface 26 is suitable for receiving radio frames in several determined frequency bands (for example, in an EHF band and in a band where all the frequencies are less than 30 GHz),
- at least one interface 27, for example two, three or four interfaces, suitable for the transmission of radio frames, (for example, signalling or data (for example, broadcasting of services or point to multipoint or point to point transmission) and particularly performing the functions of a coder and/or OFDM modulators and of at least one transmitter over a determined frequency band (for example, in an EHF band or in a band where all the frequencies are less than 30 GHz); according to a variant, an interface 27 is suitable for the transmission of radio frames in several determined frequency bands (for example, in an EHF band and in a band where all the frequencies are less than 30 GHz), and
- an MMI (Man Machine Interface) interface 28 or a specific application adapted for the display of information for a user and/or the input of data or parameters (for example, the parameterization of sub-carriers and data to be transmitted).

It is noted that the word "register" used in the description of the memories 22 and 23 designates, in each of the memories mentioned, a memory zone of low capacity (some binary data) as well as a memory zone of large capacity (enabling a whole program to be stored or all or part of the data representative of data received or to be transmitted).

The memory ROM 22 comprises in particular:
a "prog" 220 program, and
parameters 221 of physical layers.

The algorithms implementing the steps of the method specific to the invention and described below are stored in the ROM 22 memory associated with the access point 2 implementing these steps. When powered up, the microprocessor 21 loads and runs the instructions of these algorithms.

The random access memory 23 notably comprises:
- in a register 230, the operating program of the microprocessor 21 responsible for switching on the access point 2,
- the transmission parameters 231 (for example, modulation, coding, MIMO, frame recurrence parameters),
- the reception parameters 232 (for example, modulation, coding, MIMO, frame recurrence parameters),
- the incoming data 233,
- the coded data 234 for the transmission of the data,
- the reception quality parameters 235 of a signal sent by a station (for example, the power level of the signal received, the signal to noise ratio), and
- the physical channel parameters 236 (for example, allocation of a determined frequency band, of a determined code upon sending of the data by the access point 2).

The radio interface 26 is suitable for receiving the signals sent if relevant by the stations 11 to 14 of the system 1. The interface 27 is adapted for the transmission of signals to the stations 11 to 14 of the system 1.

FIG. 3 diagrammatically illustrates a hardware embodiment of a station 3 belonging to the system 1, corresponding for example to the stations 11, 12, 13 and 14 and adapted for the reception and decoding of the signals sent by the access point 2.

The station 3 comprises the following elements, connected to each other by an address and data bus 34, which also transports a clock signal:
a microprocessor 31 (or CPU),
a non-volatile memory of the ROM (Read Only Memory) type 32,
a Random Access Memory (RAM) 33,
at least one radio interface 36, for example two, three or four radio interfaces,
at least one radio interface 37, for example two, three or four interfaces, adapted for the transmission of data, and
an MMI interface 38 adapted for the display of information for a user and/or the input of data or parameters (for example, parameterization of sub-carriers and transmitted data).

It is noted that the word "register" used in the description of the memories 32 and 33 designates, in each of the memories mentioned, a memory zone of low capacity as well as a memory zone of large capacity (enabling a whole program to be stored or all or part of the data representative of sets of data received or decoded).

The memory ROM 32 comprises in particular:
a "prog" 320 program, and
parameters 321 of physical layers.

The algorithms implementing the steps of the method specific to the invention and described below are stored in the ROM memory 32 associated with the station 3 implementing these steps. When powered up, the microprocessor 31 loads and runs the instructions of these algorithms.

The random access memory 33 notably comprises:
in a register 330, the operating program of the microprocessor 31 responsible for switching on the station 3,
the reception parameters 331 and transmission parameters 332 (for example, modulation, coding, MIMO, frame recurrence parameters),
incoming data 333 corresponding to the data received and decoded by the receiver 36,
decoded data 334 formatted to be sent to the interface to the application 38,
reception quality parameters 235 of a signal sent by another station or the access point (for example, the power level of the signal received, the signal to noise ratio), and
physical channel parameters 236 (for example, allocation of a determined frequency band, of a determined code upon the emission of data).

Other structures of the access point 2 and/or of the station 3 than those described facing FIGS. 2 and 3 are compatible with the invention. In particular, according to variants, base stations and/or mobile terminals compatible with the invention are implemented according to a purely hardware embodiment, for example in the form of a dedicated component (for example, in an ASIC or FPGA or VLSI) (respectively, 'Application Specific Integrated Circuit', 'Field Programmable Gate Array', 'Very Large Scale Integration') or of several electronic components integrated into a device or in the form of a mixture of hardware elements and software elements.

The radio interface 36 is adapted for the reception of the signals sent by the access point 10 or the stations 11 to 14 of the system 1. The interface 37 is adapted for the transmission of signals to the stations 11 to 14 or to the access point 10 of the system 1.

FIG. 9 illustrates a data transmission method implemented by the access point 10 of the system 1, according to a particularly advantageous non-limitative implementation example of the invention.

During an initialization step 90, the various parameters of the access point are updated. In particular, the parameters corresponding to the signals to be sent and to the corresponding sub-carriers are initialized in any way (for example, following the reception of initialization messages sent by a server not represented of the system 1, or even by commands of an operator).

Then, during a step 91, the access point 10 sends a first request to send RTS to one or more stations 11, 12, 13 or 14. This first request to send is sent over a first physical channel. Generally, a physical channel is characterized by a frequency band and a time slot. In the particular case of a CDMA ('Code Division Multiple Access') access, a physical channel is also characterized by a spectrum spreading code. Advantageously, the first RTS request contains information representative of a data transmission request over a second physical channel different from the first physical channel. The first and second physical channels are differentiated from each other advantageously by the use of different frequency bands and/or by the use of different spectra spreading codes.

According to a variant, the first RTS request contains information representative of a request to send over the first and second physical channels.

According to another variant, the first RTS request contains information representative of a data sending request over a multiplicity of different physical channels in parallel, for example two, three, four or five physical channels.

Advantageously, the transmission rate available over the second physical channel is higher than the rate available over the first physical channel, for example twice, three times, five times or ten times higher.

Advantageously, the first physical channel uses a frequency band, all the frequencies of which belong to the 2.4 or 5 GHz band, some of these bands being ISM ('Industrial, Scientific and Medical') bands. The second physical channel uses a frequency band, all the frequencies of which belong to the 60 GHz band. The 5 GHz band corresponds for example to the frequency bands of which all the frequencies are between 5.15 GHz and 5.35 GHz or between 5.47 GHz and 5.875 GHz. A 5 GHz physical channel corresponds to a channel of width 10, 20 or 40 MHz, for example, all the frequencies of which are in one of the frequency intervals mentioned above. The 2.4 GHz band corresponds for example to the frequency bands of which all the frequencies are between 2.4 GHz and 2.5 GHz. A 2.4 GHz physical channel corresponds to a channel of width 22 MHz, for example, all the frequencies of which are in the frequency interval (2.4-2.5 GHz) mentioned above. The 60 GHz band corresponds for example to the frequency band of which all the frequencies are between 57 GHz and 66 GHz. A 60 GHz physical channel corresponds to a channel of width 2160 MHz, for example, all the frequencies of which are in the frequency interval (57-66 GHz) mentioned above. The width of a 60 GHz frequency band being higher than a 2.4 or 5 GHz frequency band width, the transmission speed available at 60 GHz is therefore higher than the available speed at 2.4 or 5 GHz.

According to a variant, the first physical channel and the second physical channel use frequency bands, all the frequencies of which are of the EHF type and belong, for example, to the 60 GHz band. According to a variant, the 60 GHz frequency bands are different. According to another variant, the frequency bands are identical and in the case of a CDMA access, the first physical channel and the second physical channel become differentiated by the use respectively of a different first spectrum spreading code and a second spectrum spreading code.

Advantageously, the first physical channel uses a frequency band, all the frequencies of which are less than 30 GHz. The second physical channel uses a frequency band, all the frequencies of which are greater than 30 GHz and lower than 300 GHz, the frequency band between 30 and 300 GHz being designated as the extremely high frequency spectrum (EHF). According to a variant, the frequencies used by the first physical channel belong to the spectrum of ultra high frequencies (UHF, the frequencies of which are between 300 MHz and 3 GHz), or to the spectrum of supra high frequencies (SHF, the frequencies of which are between 3 GHz and 30 GHz).

According to a variant, a second request to send RTS is sent over the second physical channel. Advantageously, this second request RTS is sent at the same time as the first request RTS sent over the first physical channel. According to another variant, one or more requests to send are sent over the second physical channel after the first RTS request.

According to another variant, several first RTS requests are sent over the first physical channel at regular intervals or separated by a random time interval.

According to an example of particular implementation, the at least one first RTS request and/or the at least one second RTS request are sent by at least one of the stations 11 to 14 to at least another station 11 to 14 and/or to the access point 10.

Then, during a step 92, the station 11 to 14 which is the recipient of the first request to send RTS, and which has received the first RTS request, sends a first agreement (or 'clear') to send CTS1 over the first physical channel to the access point 10, this CTS agreement then being received by the access point 10 over the first physical channel. This first agreement to send advantageously contains information enabling the access point to send data over the second physical channel if the recipient station is able to receive data sent over the second physical channel. For example, if the second physical channel uses an EHF frequency band, for example belonging to 60 GHz, according to the example illustrated in FIG. 1, only the station 11 of the system 1 is able to receive data sent at 60 GHz. Indeed, only the station 11 is in direct line of sight of the access point 10, i.e. no physical obstacle separates the station 11 from the access point 10, and the station 11 is at a distance less than 10 m from the access point 10, for example the station 11 is at a distance equal to 2 m or 5 m from the access point 10. The other stations 12 to 14, which have received the first request RTS1 and/or the first agreement CTS1 sent over the first physical channel, refrain from transmitting during the indicated time in at least one of these control frames RTS1/CTS1.

Advantageously, a second agreement to send CTS2 is sent by the recipient station of RTS over the second physical channel simultaneously with the sending of the first agreement CTS1 over the first physical channel. The first agreement CTS1 thus contains information allowing the access point to send data over the first physical channel and the second agreement CTS2 contains information allowing the access point to send data over the second physical channel. According to a variant, the first agreement CTS1 contains no information allowing the access point to send data and the only reception of the first agreement CTS1 by the access point 10 is equivalent to an authorization to send data over the first physical channel. Likewise, the second agreement CTS2 contains no information allowing the access point to send data and the only reception of the second agreement CTS2 by the access point 10 is equivalent to an authorization to send data over the second physical channel.

According to a variant not shown in FIG. 9, step 92 loops back to step 91, which is then repeated with the sending of a second request to send RTS2 via the access point 10 to the station 11. This second request RTS2 is sent after reception of the first agreement CTS1 by the access point 10 over the first physical channel allowing the access point 10 to send data over the second physical channel. The second request RTS2 is sent over the second physical channel and is a request to send data over the second physical channel. According to a variant, the second request RTS2 is sent by the access point 10 after reception by the access point 10 of the second agreement CTS2 over the second physical channel. During step 92, the recipient station of the second request RTS2 then sends an agreement to send CTS over the second channel if the second request has actually been received by the recipient station. According to another variant, two RTS requests are sent simultaneously during the repeated step 91, one over the first channel to request the agreement to send over the first channel and one over the second channel to request the agreement to send over the second channel. During step 92, two CTS agreements are sent, one over the first channel and the other over the second channel if the reception conditions are met on one and/or the other of the two channels.

Lastly, during step 93, the access point 10 sends data to the recipient station, for example the station 11 of the system 1 after reception of the first agreement to send CTS1. The first agreement CTS1 allowing the access point to send over the second physical channel, the data is sent over the second physical channel. The second physical channel using an EHF frequency band, for example 60 GHz, the transmission of data over this channel provides the advantage of having a higher bitrate than a transmission over the first physical channel using a 5 GHz frequency band. The bitrates reached over an EHF frequency band are typically between 1.5 Gbits/s and 6 Gbits/s over distances separating the sending access point and the receiving station between 2 m and 10 m. The transmission speed gain can be 5 to 10 times greater than for a 5 GHz frequency band. In the case where the first agreement CTS1 does not allow the access point to send over the second physical channel, according to an advantageous variant, the access point 10 then sends data over the first physical channel.

According to a variant, the access point 10 sends data over the first physical channel and over the second physical channel in parallel after reception of at least one agreement to send allowing the transmission of data over the first and second physical channels or after reception of a first agreement to send over the first physical channel allowing the transmission of data over the first channel and reception of a second agreement to send over the second physical channel allowing the transmission of data over the second channel. Advantageously, the data transmitted over the first and second physical channels is useful data, i.e. real data (for example, application data of the text, image, audio and/or video type or more generally multimedia) which is to be sent by the access point 10. This solution offers the advantage of optimizing the use of the bandwidth offered by the two physical channels and the bitrate. According to a variant, only the data transmitted over the second physical channel is useful data whereas the data transmitted over the first channel is dummy data transmitted to occupy the first physical channel. This variant offers the advantage of avoiding any station or access point not having reserved the channel and which would have missed the emission of the RTS/CTS sent by the access point 10 and the station 11 to send data after probing the channel. According to another variant, only the data transmitted over the second physical channel is useful data, an occupation signal sent over the first channel corresponds to dummy data transmitted to occupy the first physical channel. This solution offers the advantage of occupying the channel and so of avoiding the initialization of a transaction over this channel by another access point or another station while limiting the power consumption by reducing the time of a sending cycle (for example, emission during 9 μs and silence during 25 μs).

According to a particular implementation, one part of the data is transmitted over the first physical channel and the other part over the second physical channel. Advantageously, the part of the data transmitted over the first channel is that the priority level of which is higher than that of the data transmitted over the second physical channel. For example, the beginning of each data packet is transmitted over the first physical channel and the remainder of the packet with a lower priority level is transmitted over the second physical channel. According to another example implementing data coded hierarchically (for example, image and/or audio), data coded according to the highest priority is transmitted over the first physical channel and data coded according to the less high priority level is transmitted over the second physical channel.

These implementation examples offer the advantage of transmitting the data with the highest priority level over the most robust physical channel using a 5 GHz frequency band, and the data of lesser priority over the second physical channel less robust since it uses an EHF frequency band. The risk of losing the data transmitted is therefore less high on the first channel than on the second channel.

FIG. 10 illustrates a data transmission method implemented by the access point 10 of the system 1, according to a particularly advantageous non-limitative implementation example of the invention.

Steps 90, 91, 92 and 93 are the same as those described previously for FIG. 9 and have the same reference numbers.

At the end of step 92, i.e. after reception by the access point 10 of at least one first agreement CTS1 over the first physical channel and/or of at least one second agreement CTS2 over the second physical channel, the access point performs a quality test on the CTS agreement(s) received during a step 101 to assess the quality of the data transmission over each of the physical channels. The quality of the data transmission is estimated according to one or more any methods, for example according to one or more of the variants indicated below. According to a first variant, the quality assessment comprises an analysis of the CTS contents and a check that the latter has been entirely received and without errors by analyzing a field of the CTS frame, known as the FCS ('Frame Check Sequence') field. Advantageously, the quality of the transmission is estimated by calculating the power level of the received signal containing the CTS. According to another variant, the quality of the transmission is estimated by measuring a signal-to-noise ratio. According to another variant, the quality of the transmission is estimated according to any method known by those skilled in the art, for example by analyzing quality indicators of the Viterbi metric type, assessment of a BER ('Bit Error Rate') or FER ('Frame Error Rate') or by assessing the channel by analyzing the CTS preamble. According to the result of the CTS transmission quality assessment on each of the channels, the access point 10 gives preference to data transmission over the channel having the highest transmission quality. According to a variant, the access point checks that the S/N ratio is greater than a predetermined threshold value, that the power level of the signal received is greater than a predetermined threshold value, or also that the BER is less than a predetermined threshold value for each of the channels over which a CTS has been received. Where applicable, the access point 10 then transmits the data over the channel(s) having a transmission quality greater than the determined threshold value. According to a variant, the estimation of the transmission quality is only done on one of the two channels, the first or the second one.

At the end of step 101, step 93 related to data transmission is implemented. Step 93 is identical to that described with respect to FIG. 9. According to a variant, the transmission of data is implemented according to the quality assessment performed at step 101, by favouring for example the transmission of data over one and/or the other of the physical channels according to the result of the transmission quality assessed on one and/or the other of the channels.

At the end of the data transmission carried out during step 93 described before, an acknowledgement of the ACK type containing an information representative of the data reception by the station 11 is sent by the station 11 and received by the access point during an optional step 102 if the data transmitted by the access point 10 has been entirely received by the recipient station 11. Advantageously, the acknowledgement ACK is sent over the first physical channel to acknowledge reception of the data sent over the first physical channel and/or over the second physical channel. According to a variant, a first acknowledgement ACK1 is sent by the station 11 over the first physical channel to acknowledge reception of the data transmitted over the first physical channel. A second acknowledgement ACK2 is sent over the second physical channel to acknowledge reception of the data transmitted over the second physical channel. According to a variant, the acknowledgement ACK contains information representative of the non reception of the data (or of a partial reception of the data) over the first physical channel and/or over the second physical channel. Advantageously, if data has been transmitted over the second physical channel and if no acknowledgement ACK of this data is received by the access point 10 before expiry of a determined time (for example, 40 μs) after the end of data sending, the data not received by the station 11 is retransmitted over the first physical channel by the access point. According to a variant, if an acknowledgement ACK containing information representative of the non reception of data is received by the access point, the data is then transmitted again over the first physical channel. According to a variant, the non received data is transmitted again over the second physical channel. According to another variant, the non received data is transmitted again over the first physical channel and over the second physical channel, the data with the highest priority level being transmitted over the most robust channel, for example the first physical channel.

FIG. 7 diagrammatically illustrates the content of a frame of a request to send RTS according to a particularly advantageous non-limitative implementation example of the invention.

The RTS frame 7 is advantageously compliant with the standard IEEE 802.11-2007. The 'ID duration' field 71, for example 16 bits long, contains information representative of the value of the duration of reservation of the physical channel for the transmission of the frames by the access point 10. This duration corresponds to the temporal length of the allocation vector of the NAV network (Network Allocation Vector) 404, 503, 603 as illustrated in FIGS. 4, 5 and 6. The field RA 72 of the RTS frame, for example 48 bits long, contains information representative of the address of the station 11 to 14, destination of the data sent by the access point 10 and the control frame. The TA field 73, for example 48 bits long, contains information representative of the address of the access point or of the station sending the RTS frame 7. The FCS field (Frame Check Sequence) 75, for example 24 or 32 bits long, contains information representative of the characters of a checksum) or a CRC (Cyclic Redundancy Check) used for error correction and detection. The frame control field 70, for example 16 bits long, is subdivided into a plurality of fields. It notably contains a field 701 containing information representative of the version of the protocol used for the exchange of the data. It also contains a field 702 containing information representative of the type of the frame, namely a control frame for the RTS. The field 703 contains information representative of the sub-type of the frame, for example modified RTS containing for example a field 74 with specific frame body. The RTS frame 7 finally contains a field 74 containing information specific to the modified RTS frame. The frame 74 is subdivided into a plurality of fields. It contains a field 741 containing information representative of the number of second channels over which the access point 10 wants to transmit data, for example two 60 GHz channels. The fields 742 and 743 identify what are the second channels over which the access point requires the transmission of data. Finally, the field 744 indicates whether a transmission over the first channel, for example at 5 GHz, over which the RTS is transmitted, is requested by the access point. The 'frame control' fields 70, 'ID duration' 71, RA 72 and TA 73 form the MAC header (Media Access Control).

According to a variant, the RTS frame 7 does not contain any field in which a transmission over the first channel is required. The transmission alone of a frame over the first channel is equivalent to a request to send data on this first channel.

According to another variant, the number of second channels identified in the field 741 is one, two, three or four channels. Consequently, the number of fields 742, 743 identifying the second channels is one, two, three or four fields.

Advantageously, the RTS frame 7 is integrated into a control wrapper frame as defined in the standard IEEE 802.11n that is used to transport another control frame, typically the RTS control frame 7. The advantage of such an integration is that the nodes compliant with the standard IEEE 802.11n will be suitable for decoding such a frame and will consequently thus be suitable for positioning the network allocation vector NAV.

FIG. 8 diagrammatically illustrates the content of a frame of an agreement to send CTS according to a particularly advantageous non-limitative implementation example of the invention.

The CTS frame 8 is advantageously compliant with the standard IEEE 802.11-2007. The 'ID duration' field 81, for example 16 bits long, contains information representative of the value of the duration of reservation of the physical channel for the transmission of the frames by the access point 10. This duration corresponds to the temporal length of the allocation vector of the NAV network (Network Allocation Vector) 404, 503, 603 as illustrated in FIGS. 4, 5 and 6. The field RA 82 of the frame CTS, for example 48 bits long, is copied from the TA field of an RTS frame that immediately precedes it to which the CTS frame is a response. If the CTS frame is the first frame in the exchange of frames, the RA field 82 is filled in with the MAC address of the transmitter, for example the access point 10. The FCS field (Frame Check Sequence) 84, for example 24 or 32 bits long, contains information representative of the characters of a checksum) or a CRC (Cyclic Redundancy Check) used for error correction and detection. The frame control field 80, for example 16 bits long, is subdivided into a plurality of fields. It notably contains a field 801 containing information representative of the version of the protocol used for the exchange of the data. It also contains a field 802 containing information representative of the type of the frame, namely a control frame for the CTS. The field 803 contains information representative of the sub-type of the frame, for example modified CTS containing for example a field 83 with specific frame body. The CTS frame 8 finally contains a field 83 containing information specific to the modified CTS frame. The frame 83 is subdivided into a plurality of fields. It contains for example a field 831 containing information representative of the data transmission authorization or refusal over a first channel. As for the field 832, it contains for example information representative of the data transmission authorization or refusal over a second channel. According to a variant, the field 83 is subdivided into as many fields as there are channels over which a transmission is required, for example one, two, three or four channels.

FIG. 4 illustrates a first example of frame exchange implemented between an access point 10 and a station 11 to 14 of the system 1, according to a particularly advantageous non-limitative implementation example of the invention.

In a contention access mode (for example of the DCF type, Distributed Coordination Function) of the CSMA/CA type such as implemented in the standard IEEE 802.11-2007, the reservation of the channel over which the data is transmitted is carried out by the exchange of RTS/CTS frames. Before any transmission of data intended for a station 11 to 14, the source access point 10 analyses the first physical channel, using for example a 5 GHz frequency band (or 2.4 GHz), to determine whether the latter is used by a station or another access point of the system 1. If a data frame 400 is detected on the first physical channel over which the access point wants to send an RTS frame, the access point waits for a time determined by the backoff algorithm (for example 25 μs (duration of the DIFS)+N*9 μs (duration of a slot) where N is a random value between 15 and 1023, according to the standard IEEE 802.11-2007) before sending again on the first physical channel. When the access point detects that the physical channel is free, the access point 10 initiates the transmission of an RTS request. Before sending the RTS request, the access point 10 waits for a minimum predetermined time DIFS (DCF Interframe Space) (for example 25 μs according to the standard IEEE 802.11a/n) then waits for a random time interval 401, known as backoff time, that allows collisions on access to the channel to be minimized. The access point thus sends an RTS1 request 402 over the first physical channel. The RTS1 request 402 is an RTS frame understandable by the stations 11 to 14 (namely, by any node compliant with the standard IEEE 802.11-2007) that further contains a request to send data over a second physical channel using for example a 60 GHz frequency band. The RTS1 request 402 is intended for the station 11 of the system 1. The RTS1 request 402 contains, in its MAC header, reservation duration information of the channel. The stations 12 to 14 not concerned by the exchange of data record this duration to determine the time at which the final exchange will take place, corresponding to the end of frame ACK 406. During this time interval, the stations 12 to 14 not concerned by the data exchange do not attempt to access the channel. The remaining time slot, namely the reservation duration from which is subtracted the duration of the frames RTS1 402, CTS1 403, ACK 406 and the SIFS interval, forms the remaining duration for the exchange of data, known as NAV vector 404 (Network Allocation Vector). The station 11 responds to the RTS1 request 402 by a clear to send (or again called agreement to send) CTS1 403 after a predetermined time SIFS (Short Interframe Space) (for example 16 μs according to the standard IEEE 802.11a/n). The station 11 being at a distance less than 10 meters from the access point 10 and in direct line of sight from the access point, the station 11 then sends an agreement CTS1 403. The agreement CTS1 403 is sent on the first physical channel using a 5 GHz frequency band (or 2.4 GHz) so that all the stations of the system 1 (including the stations that are more than 10 m from the access point and non line of sight NLOS) can receive this CTS agreement. The agreement CTS1 403 is a CTS frame understandable by the stations 11 to 14 (namely, by any node compliant with the standard IEEE 802.11-2007) that further contains information authorising the access point 10 to transmit data over a second physical channel using for example a 60 GHz frequency band. The useful data 405 is then sent over the second physical channel at 60 GHz for which the bitrate is approximately 10 times greater than that of the first physical channel 5 GHz. Once the data is received by the recipient station 11, the station 11 sends a data acknowledgement ACK 406 on the first physical channel. The ACK 406 frame advantageously contains information representative of the full reception of the data sent on the second physical channel. Once the ACK frame 406 is sent over the first physical channel, the latter is then clear for another frame transmission 407.

According to a variant, the RTS1 request 402 contains information representative of an authorization request to send data over the first physical channel and over the second physical channel. The CTS1 agreement 403 sent over the first physical channel advantageously contains an agreement to transmit over the first physical channel and over the second physical channel, in response to the RTS1 request 402. Some of the data 405, namely at least one data packet, is then transmitted over the second physical channel and the other part is transmitted over the first physical channel. The data transmitted over the first physical channel advantageously has a higher level of priority than that transmitted over the second physical channel. According to a variant, the frame ACK 406 contains information relative to the acknowledgement of the data received on the first physical channel and information relative to the acknowledgement of the data received on the second physical channel. According to another variant, the frame ACK 406 contains information representative of the non-reception or of a partial reception of the data transmitted over the first physical channel and/or information representative of the non-reception or of a partial reception of the data transmitted over the first physical channel in case of poor reception of data on respectively the first channel and/or the second channel.

Advantageously, the agreement CTS1 403 contains information representative of the authorization refusal to transmit data on the second physical channel if the recipient station of the RTS1 request 402 is not suitable for receiving data on the second physical channel. The data is then transmitted on the first physical channel.

FIG. 5 illustrates a second example of frame exchange implemented between an access point 10 and a station 11 to 14 of the system 1, according to a particularly advantageous non-limitative implementation example of the invention.

Before any transmission of data intended for a station 11 to 14, the source access point 10 analyses the first physical channel, using for example a 5 GHz frequency band (or 2.4 GHz), to determine whether the latter is used by a station or another access point of the system 1. If a data frame 500 is detected on the first physical channel on which the access point wants to send an RTS request, the access point waits for a determined time (for example 205 μs corresponding to 25 μs (DIFS)+the remaining time of the backoff (for example 20*9 μs)), according to the standard IEEE 802.11-2007) before emitting again on the first physical channel. When the access point detects that the physical channel is free, the access point 10 initiates the transmission of an RTS request. Before the transmission of the RTS request, the access point 10 waits for a predetermined minimum time DIFS (for example 25 μs according to the standard IEEE 802.11a/n) then wait for a random time interval 401, known and the name of backoff time. The access point thus sends an RTS1 request 502 over the first physical channel. The RTS1 request 502 is an RTS frame understandable by the stations 11 to 14 (namely, by any node compliant with the standard IEEE 802.11-2007) that further contains a request to send data over a second physical channel using for example a 60 GHz frequency band. Advantageously, the RTS1 request 502 also contains a request to send data over the first physical channel. According to a variant, the RTS1 request 502 does not contain any explicit request to send data over the first physical channel and the transmission of an RTS1 frame on the first physical channel is understood by the recipient station as an implicit request to send data on the first physical channel. The station 11 responds to the RTS1 request 502 by an agreement to send CTS1 504 sent over the first physical channel after a predetermined time SIFS (for example 16 μs according to the standard IEEE 802.11a/n) and by a CTS2 agreement 505 sent over the second physical channel, the station 11 being suitable to receive data on the first and second physical channels. The RTS1 request 502 being sent over the first physical channel at 5 GHz (or at 2.4 GHz), all the stations 12 to 14 receive it and decode it at least in part to position a NAV reservation vector 503 of the channel. According to a variant, some stations 12 to 14 receive the agreement CTS1 and do not receive the RTS1 request. During the reservation of the channel, the stations 12 to 14 will therefore not send any request to send. Upon reception of the CTS1 504 on the first physical channel, the access point transmits a part 506 of the data, namely at least one data packet, over the first physical channel intended for the station 11. Upon reception of the CTS2 505 on the second physical channel, the access point transmits a part 507 of the data, namely at least one data packet, over the second physical channel intended for the station 11. Once the transmitted data 506 over the first physical channel is received by the station 11, this latter sends an acknowledgement of the data ACK1 508 on the first physical channel if the data 506 have been fully received and without error on the first channel. If the data has not been received or has been partially received or has been received with an error, the station 11 sends no acknowledgement or sends an acknowledgement ACK 508 over the first physical channel containing representative information of the non-reception of the data transmitted over the first channel. Once the transmitted data 507 over the second physical channel is received by the station 11, this latter sends an acknowledgement of the data ACK2 509 over the second physical channel if the data 507 has been fully received and without error on the first channel. If the data has not been received or has been partially received or has been received with an error, the station 11 sends no acknowledgement or sends an acknowledgement ACK2 509 over the second physical channel containing representative information of the non-reception of the data transmitted over the second channel. Upon reception of the frame ACK1 508 by the access point 10, the medium 510 is then clear for a new frame transmission.

According to a variant, the station 11 only sends an acknowledgement ACK1 508 to acknowledge the reception of the data transmitted over the first and second physical channels.

Advantageously, the data 506 transmitted over the first physical channel has a higher level of priority than that transmitted over the second physical channel. According to a variant, in case of non-reception of the data on the second physical channel, the latter is transmitted over the first physical channel.

The emission of a CTS1 504 over the first physical channel and of a CTS2 505 over the second physical channel has the advantage of being able to evaluate the transmission quality of the data over the first and second physical channels by the access point 10. After evaluation of the transmission quality available on each of the physical channels, the access point decides on the transmission over the first physical channel, over the second physical channel or on both in parallel.

According to a particular embodiment, a station 12, not having received that agreement CTS2 or having received it with a low level of power, and wanting to transmit data to one of the nodes of the system other than the station 11 and the access point 10, transmits the data over a physical channel, using for example another frequency band at 60 GHz that the one used by the second physical channel. The station 12 not having received the agreement CTS2, the risk of collision between the data transmitted by the access point 10 to the station 11 and of the data transmitted by the station 12 to another node capable of receiving data transmitted in this frequency band of the 60 GHz is particularly low. The transmission of data by the station 12 is advantageously preceded by an exchange of RTS/CTS frames. According to a variant, the transmission of data by the station 12 is carried out without exchange of RTS/CTS frames.

FIG. 6 illustrates a third example of frame exchange implemented between an access point 10 and a station 11 to 14 of the system 1, according to a particularly advantageous non-limitative implementation example of the invention.

Before any transmission of data intended for a station 11 to 14, the source access point 10 analyses the first physical channel, using for example a 5 GHz frequency band (or 2.4 GHz), to determine whether the latter is used by a station or another access point of the system 1. If a data frame 600 is detected on the first physical channel on which the access point wants to send an RTS request, the access point waits for a determined time (for example 25 μs (duration of the DIFS)+N*9 μs (duration of a slot) where N is a random value between 15 and 1023, according to the standard IEEE 802.11-2007) before emitting again on the first physical channel. When the access point detects that the physical channel is clear, the access point 10 initiates the transmission of an RTS request. Before the transmission of the RTS request, the access point 10 waits for a predetermined minimum time DIFS (for example 25 μs according to the standard IEEE 802.11a/n) then wait for a random time interval 601, known and the name of 'backoff' time. The access point thus sends an RTS1 request 602 over the first physical channel. The RTS1 frame 602 advantageously contains a request to send data over the second physical channel and according to a variant a request to send data on the first physical channel. Upon reception of the RTS1 request 604, the recipient station sends an agreement to send CTS1 604 over the first physical channel authorizing the access point to send data over the second physical channel. Before transmitting the data over the second physical channel, the access point emits a request to send over the second physical channel to test the availability of the second channel before sending the data. It is indeed possible that the conditions required to establish the communication on the second physical channel have changed between the emission of the CTS1 604 by the station 11 and the transmission of the data by the access point 10. If the station 11 is still able to receive data on the second physical channel, the station 11 sends an agreement to send CTS2 606 over the second physical channel. The access point then sends the data 607 over the second physical channel. Once the data is fully received and without error by the station 11, the station 11 sends a data acknowledgement ACK 608 over the first physical channel. The medium 609 is then clear for a new data transmission.

According to a variant, a second request to send RTS2 is sent by the access point over the second physical channel in case of non-reception of a CTS2 agreement over the second channel within a predetermined time.

Advantageously, the access point sends a part of the data to transmit over the first channel from reception of the agreement to send CTS1 604, without waiting for the reception of the agreement to send CTS2 606 sent on the second physical channel. According to a variant, if the transmission of data does not prove to be possible on the second channel, all the data to send is sent over the first physical channel.

FIG. 11 illustrates a communication management method implemented by a station 11 to 14 or by the access point 10 of the system 1, according to a particularly advantageous non-limitative implementation example of the invention.

During an initialization step 110, the various parameters of the station are updated. In particular, the parameters corresponding to the signals to be sent and to the corresponding sub-carriers are initialized in any way (for example, following the reception of initialization messages sent by an access point of the system 1, by a server not represented of the system 1, or even by commands of an operator).

Then during a step 111, a station 11 receives over a first physical channel one (or more) RTS requests to send sent by an access point 10 or another station 12 to 14 of the system 1. The request to send is a request to send data over a first physical channel and/or over a second physical channel. The second physical channel uses a frequency band, all the frequencies of which are greater than 30 GHz and lower than 300 GHz, the frequency band between 30 and 300 GHz being designated as the extremely high frequency spectrum (EHF). The first and second physical channels are characterized by a frequency band and by a spreading code in the case of a CDMA. The first and second physical channels are different, namely that they each use a different frequency band and/or they each use a different spreading code. According to a variant, the request to send contains one or more requests to send data over a third and/or a fourth physical channel in addition to the first and/or the second physical channel. According to another variant, several RTS requests are sent over the first physical channel. According to a variant, the access point 10 receives one or more requests to send sent by a station 11 to 14.

Lastly, during a step 112, the station 11 having received the RTS request(s) sends one or more agreements to transmit over the second physical channel CTS in response to the RTS request(s). If the access conditions to each of the channels over which the access point wants to send data are met, the agreement to send authorizes the transmission of data over each of the available channels. According to a variant, a plurality of CTS agreements are sent over the second channel in response to the plurality of RTS requests received on the first physical channel. According to a variant, one or more agreement(s) to transmit over the second physical channel CTS is (are) sent by the access point 10.

Naturally, the invention is not limited to the embodiments previously described.

In particular, the invention is not limited to a system comprising a single access point but extends to a system comprising a plurality of access points. Furthermore, the invention in not limited to a system with RTS/CTS frames exchange compatible with the standard IEEE 802.11-2007 but extends to any system implementing an contention access to the channel (for example of the DCF type) of type CSMA/CA as for example the systems with RTS/CTS frame exchange compatible with the standard IEEE 802.15.4, with the standard IEEE 802.15.3 or with the standard ECMA-368 published in December 2007 under the title "High Rate Ultra Wideband PHY and MAC Standard".

According to a variant, the request to send (respectively the plurality of requests to send) is (are) sent by a station intended for another station and the RTS/CTS frame exchange is carried out between two stations, advantageously on the first physical channel, the data being advantageously sent over the second physical channel.

According to another variant, the request to send (respectively the plurality of requests to send) is (are) sent by an access point intended for another access point and the exchange of RTS/CTS frames is carried out between two access points, advantageously on the first physical channel.

Advantageously, a plurality of first requests to send is sent at regular intervals over the first physical channel. This solution has the advantage of being able to adapt to the variations in transmission conditions on each of the first and second physical channels according to the reception or non-reception of agreements to transmit CTS in response to the plurality of RTS requests.

In an advantageous manner, the transmission of a frame over the first physical channel noticeably occupies the same time as the transmission of a frame over the second physical channel, the difference in busy time between a frame sent over the first physical channel and a frame sent over the second physical channel being for example less than 9 μs or than 4 μs.

According to a variant, the access point 10 sends, advantageously over the first physical channel, an RTS frame of a request of agreement for sending data to several stations, said stations in return each send an agreement to send CTS, where applicable. According to the CTS's received, the access point 10 sends data to the plurality of stations in multicast mode.

According to an advantageous implementation example, the passage of the first physical channel to the second physical channel for the transmission of frames is carried out according to a physical mode change mechanism of the viewpoint of the MAC layer. A single MAC layer receives frames to send: the MAC layer selects the physical mode (physical mode of the first physical channel or physical mode of the second physical channel) according to a link adaption mechanism known to those skilled in the art, to which is added a channel selection mechanism by exchange of RTS/CTS frames. The MAC layer sends a request to send to the physical layer, a selector receiving the request to send to make it follow to the physical layer corresponding to the first channel or to the physical layer corresponding to the second channel according to the physical mode.

The invention claimed is:

1. A transmission method in a wireless network comprising a node, said method comprising:
   transmitting by the node over a first physical channel a first request to send data;
   receiving by the node, over the first physical channel, of a first agreement to send data over a second physical channel using a frequency band belonging to extremely high frequencies,
   the first and second physical channels being different, the first physical channel being less sensitive to external perturbation than second physical channel; and
   transmitting data after said reception of said first agreement to send data.

2. The method according to claim 1, wherein said node accesses the wireless network by using a contention access method.

3. The method according to claim 1, wherein the first physical channel and the second physical channel use different frequency bands.

4. The method according to claim 1, wherein the first physical channel uses a frequency band, all the frequencies of which are less than 30 GHz.

5. The method according to claim 1, further comprising transmitting by the node over the second physical channel a second request to send data over the second physical channel.

6. The method according to claim 1, further comprising receiving by the node over the second physical channel a second agreement to send data over the second physical channel.

7. Method according to claim 1, wherein further comprising receiving by the node over the first physical channel a second agreement to send data over the first physical channel, the first agreement to send data being received over the second physical channel.

8. The method according to claim 1, further comprising:
   receiving quality test results of the first agreement to send data and receiving quality test results of a second agreement to send data; and
   transmitting data over the first physical channel and/or over the second physical channel according to the results of the quality tests.

9. The method according to claim 1, wherein a data packet transmitted over the first physical channel has a higher priority level than a data packet transmitted over the second physical channel.

10. The method according to claim 1, wherein a portion of data transmitted over the second physical channel is transmitted again by the node over the first physical channel, if information representative of non-reception of the data transmitted over the second physical channel is received by the node, or no information representative of the reception of the data transmitted over the second physical channel is received before expiration of a pre-determined time.

11. The method according to claim 1, wherein information representative of the reception of data transmitted over the second physical channel is received by the node over the first physical channel.

12. The method according to claim 1, wherein the first request to send data comprises at least one field including information representative of a request to send data on the first and/or the second physical channel.

13. The method according to claim 1, wherein the first agreement to send data comprises at least one field including information representative of an authorization or refusal to send data over the first and/or the second physical channel.

14. A communication management method in a wireless network comprising a node, said method comprising:
   reception by the node over a first physical channel of a first request to send data; and
   transmitting by the node, over the first physical channel, of a first agreement to send data over a second physical channel using a frequency band belonging to extremely high frequencies, the first and second physical channels being different, the first physical channel being less sensitive to external perturbation than the second physical channel.

* * * * *